Aug. 14, 1934.  R. B. PEALER ET AL  1,969,854
PIPE WORKING TOOL
Filed Jan. 22, 1932  6 Sheets-Sheet 2

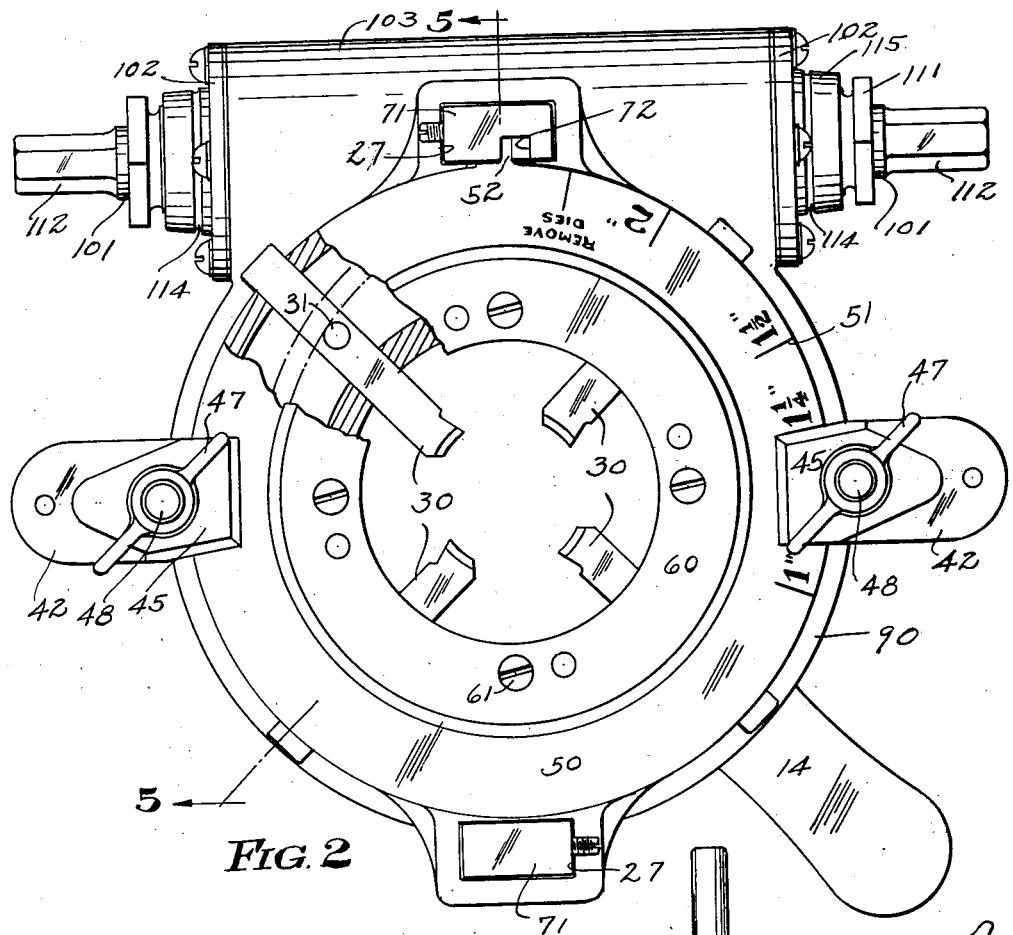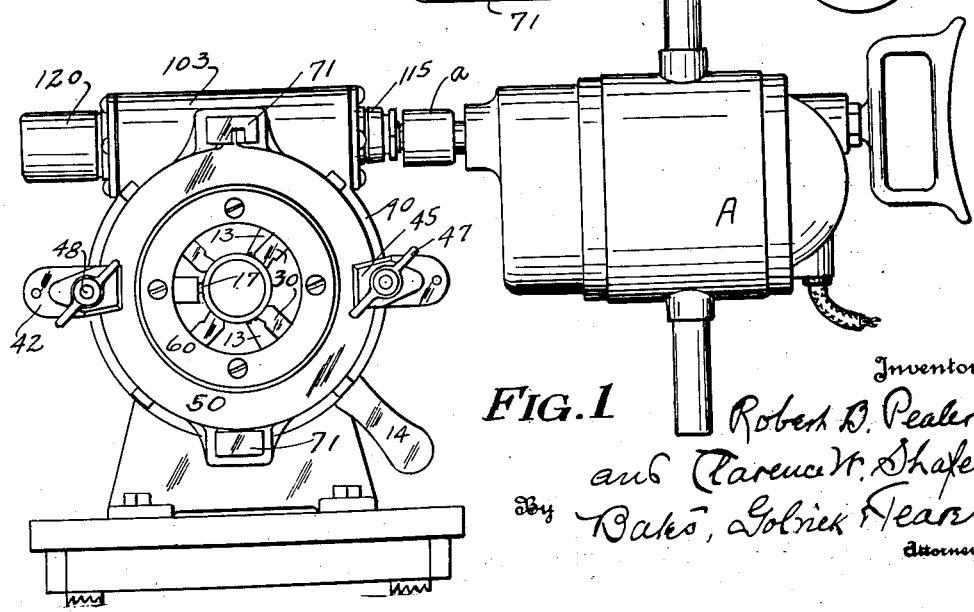

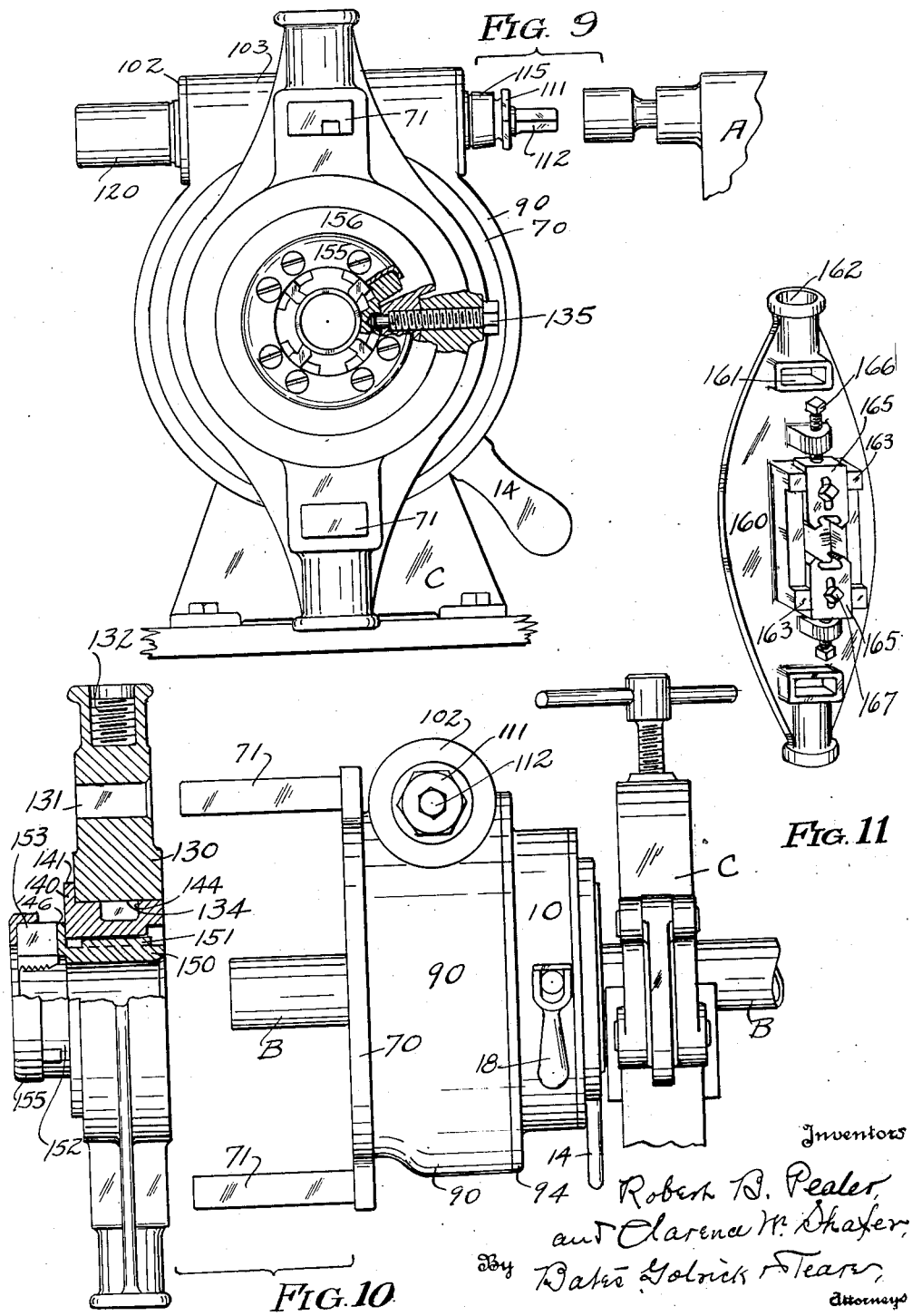

Patented Aug. 14, 1934

1,969,854

UNITED STATES PATENT OFFICE 1,969,854

PIPE WORKING TOOL

Robert B. Pealer, Parkman, and Clarence W. Shafer, Warren, Ohio, assignors to The Borden Company, Warren, Ohio, a corporation of Ohio Application January 22, 1932, Serial No. 588,124

4 Claims. (Cl. 10—120.5)

This invention relates to a mechanism adapted to be clamped on a stationary pipe to transmit power from a suitable extraneous source to a member adapted to perform work. To this end, we provide a power head adapted to be clamped to the pipe and containing, in a very simple form, effective reduction gearing which may be coupled with a suitable extraneous source of power and which will deliver a comparatively slow rotation to a pipe threader, or cutter, or other tool connected with the head. The power may come from an electric or pneumatic drill, or other readily available device having a power driven shaft.

The rotatable power-driven member of our invention has posts parallel with the pipe axis which the pipe-working member may slidably engage. This, in case the pipe-working member is a threader, enables it to gradually approach the clamped frame during the threading operation. If the pipe-working member is simply a cutter, this slidable provision is still useful in enabling an accurate setting of the cutter after the frame has been clamped in place.

In case a threading operation is to be performed, the driven threading frame may carry a solid die block, or a pair of coacting threading blocks held in adjusted position, or it may have several radial chasers suitably held. In the latter case, these chasers may be either in fixed position for a single size pipe, or may be adjustable by the usual scroll arrangement for different sizes of pipe. If desired, the chaser-carrying frame may be connected with the power head by a suitable lead screw; and, if desired, the posts connecting the power head with the chaser frame may have inclined guides operating to cause a gradual recession of the chasers as the threading progresses after the manner of a receding die stock.

If our invention is embodied in a die stock of the type having a work holder connected by a lead screw with a rotatable chaser frame, then the driving member of our reduction gearing is carried by the work holder, which, in this case, is the member clamped to the pipe; and the driven member of such reduction gearing is connected to the annular chaser-carrying frame in such manner that the chaser frame must rotate with such driven member, but can move lengthwise of the pipe with reference thereto as the threads are cut.

In carrying out the invention in its preferred form, we mount a rotatable worm, transversely of the pipe axis, in an extension of an annular frame clamped on the pipe. This worm meshes with a worm wheel rigid with a member which rotates on the annular frame and has longitudinal posts slidably carrying the cutter or chaser frame. Furthermore, we arrange to have both ends of the worm shaft project to the exterior of the bearings and be there formed angularly so that either end may be readily engaged by the rotating power device. It follows from this double-ended construction, which is also a feature of our invention, that the same power device, rotating in a constant direction, if applied to one end of the worm shaft will rotate a chaser head, for example, in the direction to the cut threads, while if applied to the other end, the chaser head will be rotated in the opposite direction, so that the chasers may back off from the thread cut. In such backing movement, the resistance or load being removed or greatly reduced, the speed of the motor may automatically increase; so that the time required in withdrawing the die head is comparable to that present in the usual in hand operation of spinning of the die stock backwardly.

In the drawings, we have illustrated our power device as embodied in a receding die stock; also as operating different forms of stationary dies; also as operating an adapter which may receive and hold various pipe cutting dies; and also as a pipe cutter of the self-feeding type.

In these drawings, Figs. 1 to 8, inclusive, illustrate the invention embodied in a settable receding die stock; Figs. 9 to 11 show the power head associated with other forms of threading devices; Figs. 12 and 13 as operating a pipe cutter. The different views of the drawings are as follows:

Fig. 1 is an end elevation of our die stock in use, illustrating the power applied thereto by an electric drill.

Fig. 2 is a similar elevation on a larger scale partly broken away of the die stock itself.

Fig. 9 is an end elevation of an embodiment wherein our power device operates an adapter carrying a die head.

Fig. 10 is a separated side elevation of the same, showing the adapter in position to be placed on the driving posts, part of the adapter and die head being shown in section.

Fig. 11 is a perspective of a different form of die carrier adapted to be mounted on, and driven by, our power mechanism.

Figure 3:
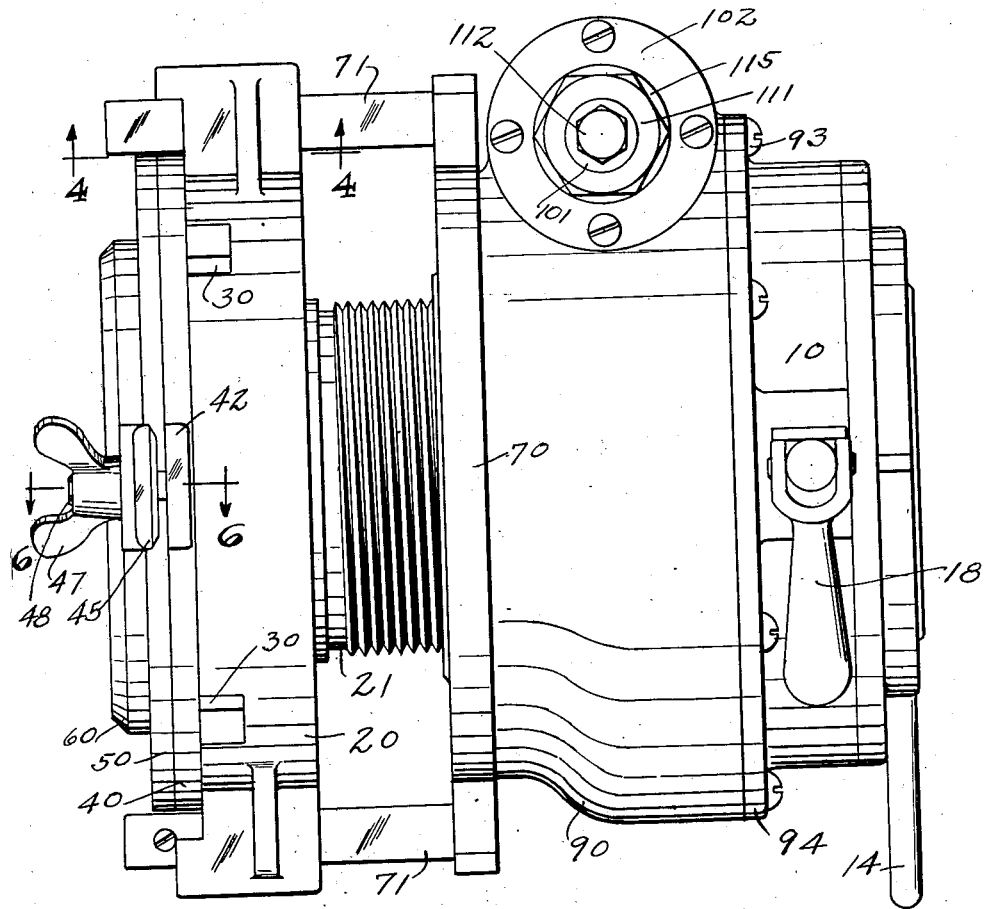
Fig. 3 is a side elevation of the die stock.
Figure 4:
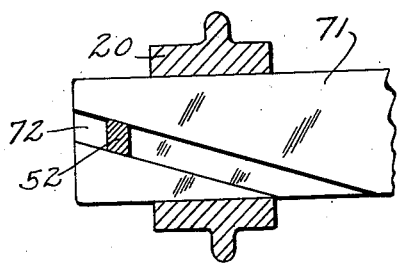
Fig. 4 is a detail of the recession controlling post of the die stock, being a section on the line 4—4 of Figs. 3 and 5.

We will describe first the receding die stock embodiment illustrated in Figs. 1 to 6, inclusive. In such embodiment, the stationary frame of the power device corresponds in some ways to the work holder of a die stock in that it is adapted to be clamped to the pipe and carry the driving mechanism, and also a lead screw with which the driven device engages. As shown, this work holder frame comprises a tubular member 10 having near its outer end suitable means for clamping it to the pipe, and having adjacent its other end an internal thread 11 cooperating with an external thread on a sleeve of the chaser-carrying frame, as hereinafter explained. Any suitable means may be employed to clamp the work holder on the pipe. We have illustrated a pair of blocks or jaws 13, 120° apart, and settable to various positions by a rotatable annular cam plate 14 which has scroll ribs 15 coacting with the blocks. To complete the clamping, we provide a screw 17, 120° from each of the blocks 13, threaded in the work holder and operated by an external handle 18.

In this embodiment, the chaser-carrying head comprises a disc-like member 20 having secured to its inner side an externally threaded sleeve 21 meshing with the threads 11 of the work holder and having on its outer side means for guiding the radial chasers 30. As shown, the disc 20 carries an inner annular wall 23 and an outer wall 24, which have aligned radial notches for receiving the chasers. The chasers 30 are shown as bars rectangular in cross section, having cutting teeth on their inner ends and having pins 31 projecting from their outer faces. These pins occupy scroll grooves 41 in a cam plate 40. This cam plate has a pair of diametrically extending arms 42 by which the plate may be shifted to set the chasers in any position desired for different sizes of pipe. Surmounting the cam plate 40 is an indicating plate 50, having suitable markings to designate different sizes of pipe, and shown as held in place by an L-shaped ring 60 which is secured by screws 61 to the chaser head and overlaps the indicating plate. The cam plate may be clamped to the indicating plate by suitable clamps 45 to lock the cam plate in set position.

As shown, the clamps 45 comprise blocks resting on the arms 42 and loosely pinned to them, at 43, and overlapping the indicating plate, and caused to be clamped against such plate by the turning down of wing nuts 47 threaded onto studs 48 secured to the cam plate arms. The edge of one of the blocks 45 coacts with any of the indications 51 of the indicating plate and hence shows the setting of the cam plate and chasers.

If the die stock is of the non-receding type, the indicating plate is stationary. However, to make the die stock recede, we provide means shown for gradually rotating the indicating plate during the threading operation. This may be readily effected by inclined guides on the posts of the driving mechanism, which we will now describe.

Rotatably mounted on the stationary frame or work holder is a driven ring 70, which carries a pair of diametrically opposed posts 71, which extend through openings 27 in the chaser frame, which frame thus entirely surrounds the posts, so that they have a good driving connection therewith, though the frame is longitudinally movable along the posts.

The ring and posts furnish the intermediate members for driving the chaser frame. The means for driving the ring will be presently described. It may be stated at this point, however, that, in the case of a receding die stock, by simply making an inclined groove 72 in one of the posts occupied by a projecting lug 52 on the indicating plate, we can effect recession of the dies as the threading progresses.

Figure 5:
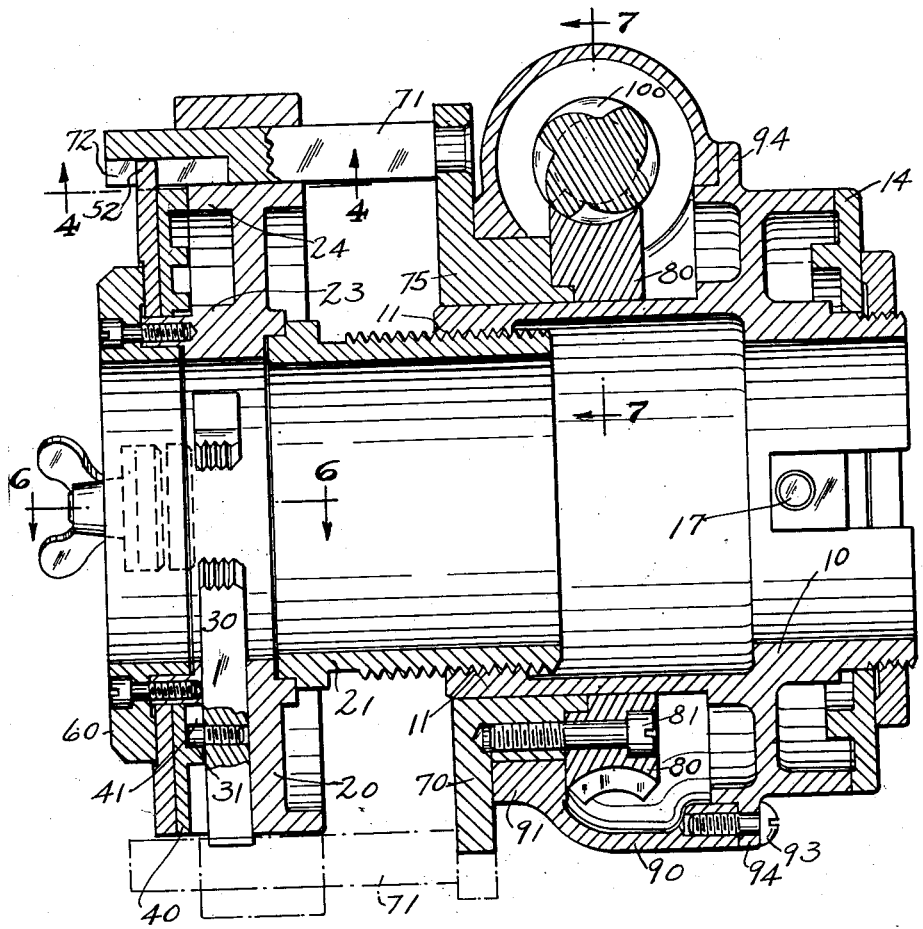
Fig. 5 is an axial section through the die stock in a diametric plane at right angles to the driving worm.
Figure 6:
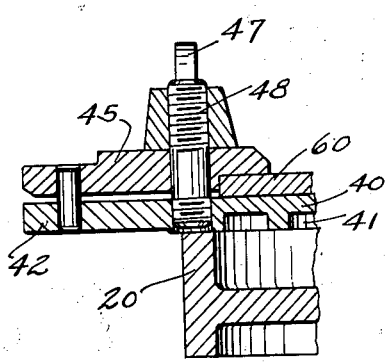
Fig. 6 is a detail of a cam clamp which may be employed, the position being indicated by the line 6—6 on Fig. 5.
Figure 7:
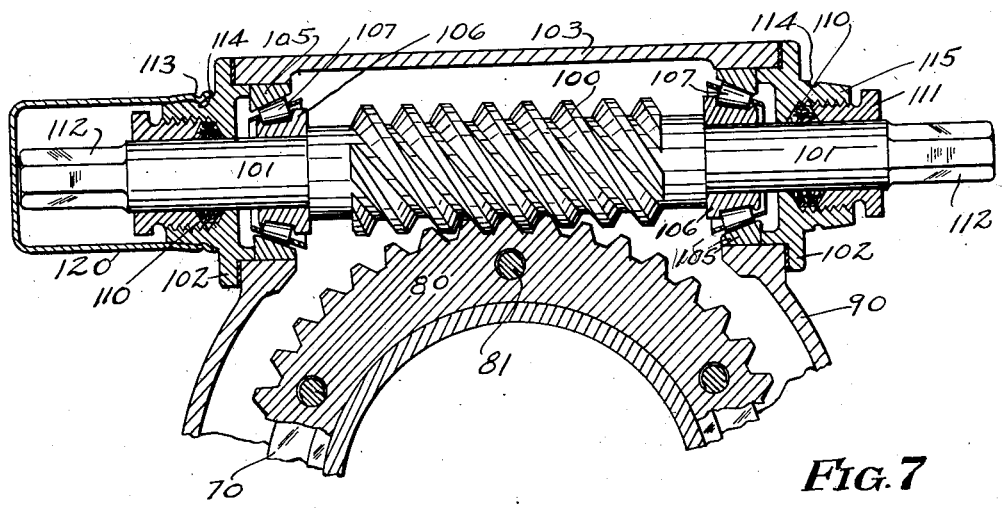
Fig. 7 is a transverse section through the axis of the worm, as indicated by the line 7—7 on Fig. 5.
Figure 8:
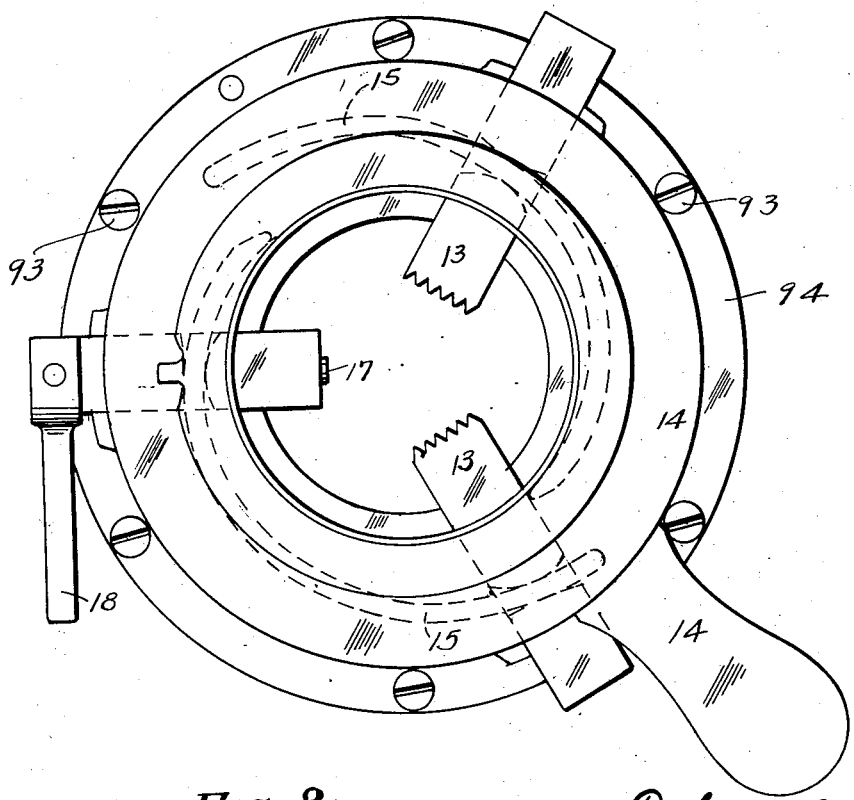
Fig. 8 is a view of a work holder clamp which may be employed, being an inner end elevation of the work holder.

We will describe now the means for driving the ring and posts, referring particularly to Figs. 5 and 7. We have secured directly to the hub 75 of the ring 70 a driving worm wheel 80, shown as bolted to such hub by bolts 81. The worm wheel extends beyond the periphery of the hub 75, and in the annular recess thus provided lies an enlarged flange 91 of an enclosing house 90 which extends about the worm wheel and beyond it is secured directly to the stationary frame, as by means of screw bolts 93 passing through a flange 94 formed on the frame. This arrangement serves to house the worm wheel and at the same time holds the worm wheel and the post ring against longitudinal movement on the frame while allowing them to freely rotate.

Meshing with the worm wheel 80 is a driving worm 100 which is formed on a double-ended shaft 101 journalled in bearings in an extension of the worm wheel housing 90. We have shown two circular end members 102 and 103 which are mounted in the housing extension (which here has a cylindrical form transverse of the die-stock axis) and which carry the worm-shaft bearings. We have shown roller bearings comprising outer race members 105 secured to the housing, inner race members 106 secured to the worm shaft, and intermediate bevel rollers 107. Beyond the worm, at either end, the shaft 101 extends through the bearing and then through a stuffing box consisting of packing 110 and a suitable gland nut 111; and beyond such stuffing box, the shaft is formed with an angular end portion 112 adapted to be embraced by a suitable socket on the power-driving device.

It will be seen that the housing 90 for the worm gearing, with the end members 102 and 103 and the stuffing boxes carried thereby, make a complete enclosure for the worm drive; hence, the space about the worm and worm wheel may be packed with grease, which will be retained therein indefinitely.

In Fig. 7 we have indicated at 120 a suitable tubular guard extending over the idle end 112 of the shaft,—this guard having an inward rib 113 to obtain a frictional engagement in a recess 114 in housing hub 115 outside of the stuffing box. The engagement, however, is merely frictional and a suitable manual force applied to the guard will readily remove it.

In Figs. 9 and 10, we have shown our power head clamped on a pipe B mounted in a suitable vise C, and an adapter 130 formed to carry a die head and provided with openings 131 slidably engaging the posts 71 of the power driven member 70. The adapter is furnished with sockets 132 in which short handles may be inserted to provide ready means for pressing the dies against the pipe to start the threading, as in this case there is no lead screw connection between the chaser frame and the stationary frame. The adapter has an axial opening 134 adapted to receive any suitable die head held in place by a radial set screw 135 adapted to occupy a recess in the inserted member. Such inserted member might, for instance, comprise dies or chasers mounted in a sleeve or bushing fitting directly into the opening 134 and having a recess in its barrel to receive the screw 135. An illustration of such a die head is found in application Serial No. 503,895 of Wm. A. Phillis, assigned to The Borden Company.

In Figs. 9 and 10, we have shown the adapter opening 134 as of considerably greater diameter than that of the barrel of the particular die head 150 shown, and the space is taken up by a bushing 140. This bushing is shown as having a flange 141 resting against the outer face of the adapter, and its body as having a radial opening through which the screw 135 passes into engagement with the barrel of an inserted die head 150.

On its inner periphery, the bushing is provided with a longitudinal groove 146 adapted to be occupied by a key 151 formed on the exterior of the barrel 150. This barrel is shown as having an enlarged head portion 152 in which are radial notches occupied by chasers 153. The chasers are clamped in place by a ring 155, L-shaped in cross section, held on the head by screws 156. Such form of die head is shown, described and claimed in Patent No. 1,803,484, granted to our assignee, The Borden Company.

By using such an adapter as shown in Figs. 9 and 10, with a fairly large central opening, the same adapter may carry a variety of die heads by the use of suitable bushings.

In Fig. 11 we have indicated, at 160, a die carrier in the form of a plate having bosses with openings 161 to receive the posts 71, and having sockets 162 to receive the pressure handles. This plate is shown as having a pair of ribs 163 carrying between them adjustable die blocks 165 positioned by set screws 166 and locked by screws 167. When such a die head is placed on the posts 71, and pressed by the handles onto the pipe, our power mechanism furnishes means for rotating it, as already described.

In the construction illustrated by Figs. 9 to 11, it will be seen that the driving posts 71 not only drive the chaser-carrier, but actually support it, maintaining it in true axial relation to the pipe; and there is no tendency for the weight of the head to cause the device to sag as it is going onto the pipe. The die carrier is advanced after the threading starts by the thread itself; and the carrier slides along the posts during such operation. Thus the perfect thread may be cut.

Figure 12:
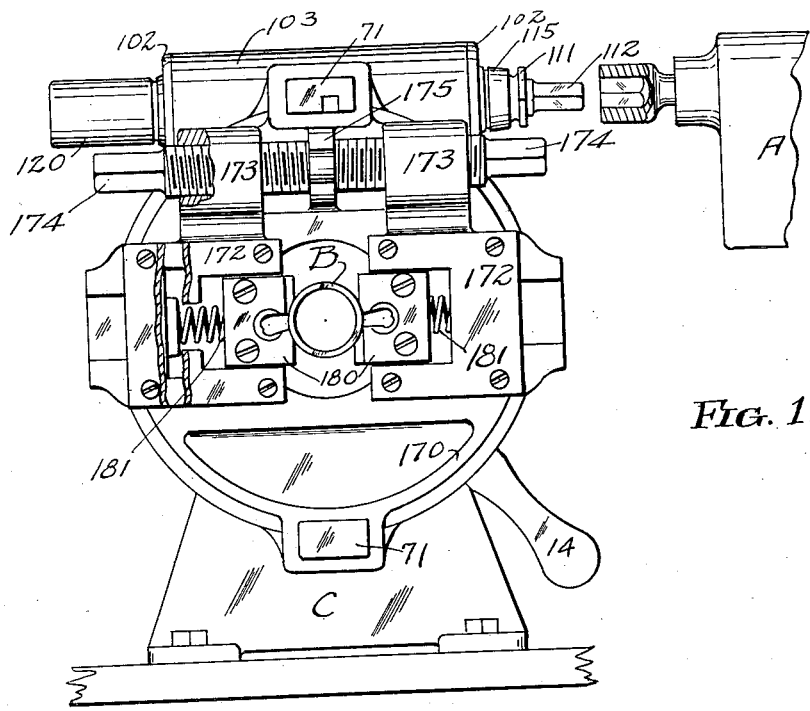
Fig. 12 is an end view of our power mechanism embodied with a self-feeding pipe cutter driven thereby.
Figure 13:
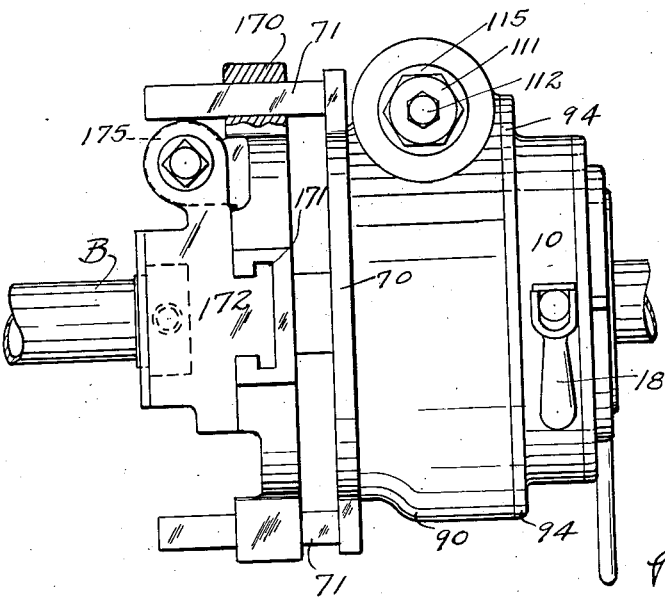
Fig. 13 is a side elevation, partly sectional, of the embodiment shown in Fig. 12.

In Figs. 12 and 13 we have shown our power mechanism driving a self-feeding cutter of the general type of Patent No. 1,150,220 of The Borden Company. In this case, the posts 71 slidably engage openings in a frame 170 which has a transverse guideway 171 in which are mounted a pair of blocks 172 carrying cutter knives. These blocks have ears 173 which engage the right-and-left-hand screw 174 intermediately mounted in a forked boss 175 carried by the frame 170. Accordingly, the blocks may be positioned as desired by the right-and-left-hand screw to bring the cutter against the pipe shown at B.

The cutters 180 are shown as mounted on blocks slidably guided in the blocks 172, these sliding blocks being pressed by springs 181 toward the pipe. With this construction, when the cutting head is in proper position, the right-and-left-hand screw is turned to not only bring the cutter knives into engagement with the pipe but to press them back into the housings, compressing the springs 181; and then, as the cutting progresses by the power rotation of the head 170, the springs feed the cutters into the pipe.

In this operation of a cutter, while the cutter does not move longitudinally of the pipe during the threading operation, the provision for longitudinal movement is nevertheless of advantage as it enables the power frame to be clamped roughly in position on the pipe and the cutter thereafter set accurately with the cutter knives in the exact region where the pipe is to be severed.

In the operation of any of the forms of our device, the pipe is clamped in a vise and the frame applied to such stationary pipe in the usual manner of a die stock work holder; but instead of the tool head being rotated by man-power, one simply applies the socket of an electric or pneumatic drill, as indicated at A in Fig. 1, to one of the projecting ends 112 of the worm shaft.

Assuming that rotation of the drill shaft is right-handed, its application for instance to that end of the worm shown at the right-hand in Fig. 7, will rotate the worm in a direction to give a right-hand rotation to the worm wheel to carry around the chasers of a die head, for instance, in the cutting direction. Now to remove the die stock without changing the direction of the rotation of the drill, one simply applies it to the other end of the worm shaft 112, the guard being shifted to the other end. When applied to the left-hand end of the shaft in Fig. 7, the right-hand rotation of the drill turns the worm in the direction to give a left-hand rotation to the worm wheel; thus causing the chasers to back off from the pipe.

It will be seen, therefore, that we have provided a very simple form of reduction gearing readily available for giving a comparatively slow rotation to the driven tool from a comparatively rapidly operating driven shaft of an ordinary electric or pneumatic drill, or other source of power. In the backing-off operation of a thread cutter, since the chasers are relieved of their cutting load, little power is required, and hence the drill motor may operate at a much increased speed, so that the removal of the die head is accomplished very quickly.

While our device is intended for read application of available power, it will be understood that, in case of an emergency, one might apply a suitable hand crank to the proper projecting end of the worm shaft and thus cause the operation manually.

We claim:

1. In a cutting tool, the combination of an annular frame, a ring rotatably mounted thereon and having means for driving a tool, said ring having a hub of smaller diameter than the ring, a worm wheel secured to said hub in spaced relation to said ring and extending radially beyond said hub to form a recess, a housing for the worm wheel secured to the frame and having an annular portion occupying the recess between said ring and worm wheel, and a worm engaging the worm wheel for driving the same.

2. In a die stock, the combination of a work holder having a sleeve, a chaser frame having a sleeve, meshing screw threads on the two sleeves, a ring rotatable on the work holder sleeve and so connected with a chaser frame that the two must rotate together, said ring having a hub of smaller diameter than the ring, a worm wheel secured to said hub in spaced relation to said ring and extending radially beyond said hub to form a recess, a housing for the worm wheel having an annular portion occupying the recess between said ring and worm wheel, and a worm rotatably mounted in the housing and engaging the worm wheel for driving the same.

3. In a device of the character described, the combination of an annular frame provided with a means for clamping it on a pipe, a rotatable ring carried by the frame, a plurality of posts carried by the ring, a worm wheel rigid with the ring, a driving worm journalled in the frame and meshing with the worm wheel, an adapter having a plurality of openings embracing said posts whereby the adapter is slidably carried on the ring but must rotate therewith, said adapter having an opening in which a die head may be mounted and having means for carrying handles whereby the dies may be pressed onto the pipe.

4. In a die stock, the combination of a work holder provided with means whereby it may be clamped on a pipe, said work holder having an internally threaded sleeve portion surrounding the pipe and a laterally extending portion, a chaser-carrying frame having an externally threaded sleeve engaging the internal thread on the sleeve of the work holder, a ring rotatably mounted on the work-holder sleeve and so connected with the chaser-carrying frame that they rotate together, said ring having a hub of smaller diameter than the ring on one side, a worm wheel secured to said hub in spaced relation to said ring and extending radially beyond the same to form a recess, a housing for the worm wheel having a mouth portion occupying the recess about the ring hub and having a body portion extending over the worm wheel and secured to the lateral extension of the work holder, said housing having a tubular portion tangentially of the worm wheel, a worm occupying said tubular portion of the housing and meshing with the worm wheel and having a shaft extending in each direction from its body, bearings for the respective shaft extensions, and end-members for the tubular portion of the housing surrounding the shaft extensions and carrying the bearings and each provided with a stuffing box through and beyond which the shaft extends.

ROBERT B. PEALER.
CLARENCE W. SHAFER.